US010186907B2

(12) United States Patent
Vitali et al.

(10) Patent No.: US 10,186,907 B2
(45) Date of Patent: Jan. 22, 2019

(54) WIRELESS POWER TRANSMITTING/RECEIVING DEVICES AND METHODS

(71) Applicants: STMICROELECTRONICS, INC., Coppell, TX (US); STMICROELECTRONICS S.R.L., Agrate Brianza (IT)

(72) Inventors: Andrea Lorenzo Vitali, Santa Clara, CA (US); Michael Galizzi, San Jose, CA (US)

(73) Assignees: STMicroelectronics, Inc., Coppell, TX (US); STMicroelectronics S.r.l., Agrate Brianza (IT)

( * ) Notice: Subject to any disclaimer, the term of this patent is extended or adjusted under 35 U.S.C. 154(b) by 148 days.

(21) Appl. No.: 15/169,482

(22) Filed: May 31, 2016

(65) Prior Publication Data
US 2017/0346340 A1 Nov. 30, 2017

(51) Int. Cl.
*H01F 27/42* (2006.01)
*H02J 50/12* (2016.01)
*H02J 7/02* (2016.01)
*H02J 7/00* (2006.01)

(52) U.S. Cl.
CPC ............ *H02J 50/12* (2016.02); *H02J 7/0054* (2013.01); *H02J 7/025* (2013.01); *H02J 2007/0059* (2013.01)

(58) Field of Classification Search
CPC .................................. H02J 7/025; H02J 50/12
See application file for complete search history.

(56) References Cited

U.S. PATENT DOCUMENTS

| | | | |
|---|---|---|---|
| 2010/0148723 A1* | 6/2010 | Cook | G06K 7/0008 320/108 |
| 2013/0257360 A1 | 10/2013 | Singh | |
| 2013/0293189 A1* | 11/2013 | Low | H01F 38/14 320/108 |
| 2015/0244176 A1* | 8/2015 | Van Den Brink | H02J 5/005 307/104 |
| 2015/0280792 A1* | 10/2015 | Chen | H02J 5/005 307/104 |
| 2016/0028269 A1 | 1/2016 | Miller et al. | |

(Continued)

OTHER PUBLICATIONS

Cantrell, "How to Design a Class-E Transmitter for Your LowFER Beacon," Aug. 1998, <http://www.k3pgp.org/Notebook/Wd5cvg/Classetx/classetx.htm>, 12 pages.

(Continued)

*Primary Examiner* — Jared Fureman
*Assistant Examiner* — Duc M Pham
(74) *Attorney, Agent, or Firm* — Seed Intellectual Property Law Group LLP

(57) ABSTRACT

A wireless power transmitting/receiving device includes a power transmitting/receiving element, a plurality of switches, a current sensor and a controller. Each of the plurality of switches has a control terminal and a conduction terminal, with the conduction terminal being coupled to the power transmitting/receiving element. The current sensor senses a current through the power transmitting/receiving element, and the controller is configured to control the plurality of switches based on the sensed current.

25 Claims, 12 Drawing Sheets

(56) References Cited

U.S. PATENT DOCUMENTS

2016/0261191 A1* 9/2016 Akram ................ H02M 3/1588
2016/0301251 A1* 10/2016 Cho ........................ H02J 50/12

OTHER PUBLICATIONS

Chan et al., "A Primary Side Control Method for Wireless Energy Transmission System," IEEE Transactions on Circuits and Systems—I: Regular Papers, vol. 59, No. 8, Aug. 2012, pp. 1805-1814.
De Rooji, "eGAN FET based Wireless Energy Transfer Topology Performance Comparisons," IEEE, 2014, 5 pages.
Kee et al., "The Class E/F Family of ZVS Switching Amplifiers," IEEE, 2003, 15 pages.
Lidow et al., "Performance Evaluation of Enhancement-Mode GaN Transistors in Class-D and Class-E Wireless Power Transfer Systems," PowerGuru—Power Electronics Information Portal, posted May 16, 2014, <http://www.powerguru.org/performance-evaluation-of-enhancement-mode-gan-transistors-in-class-d-and-class-e-wireless-power-transfer-systems/>, 10 pages.

* cited by examiner

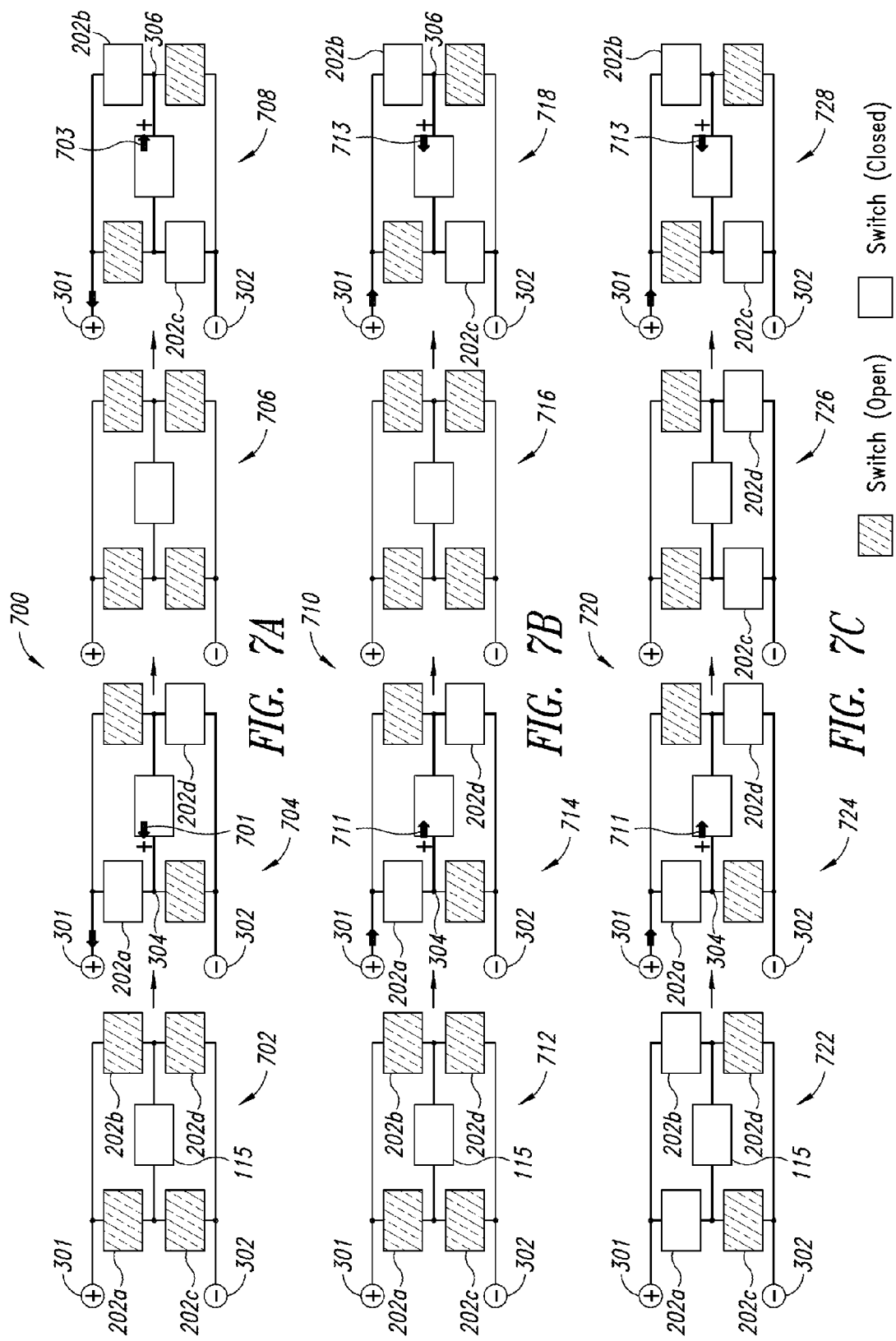

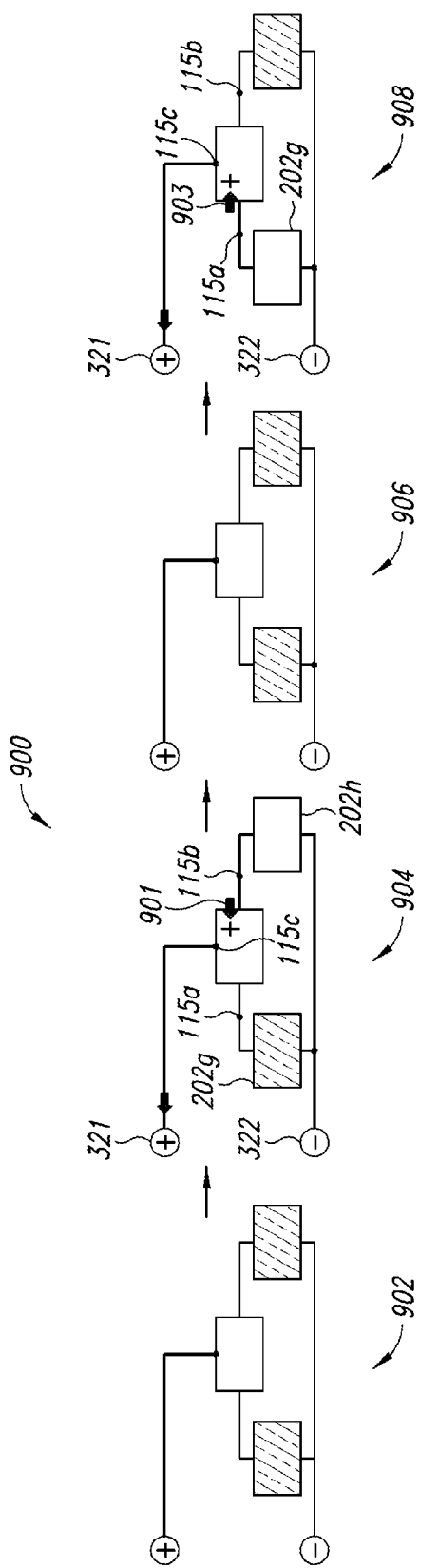
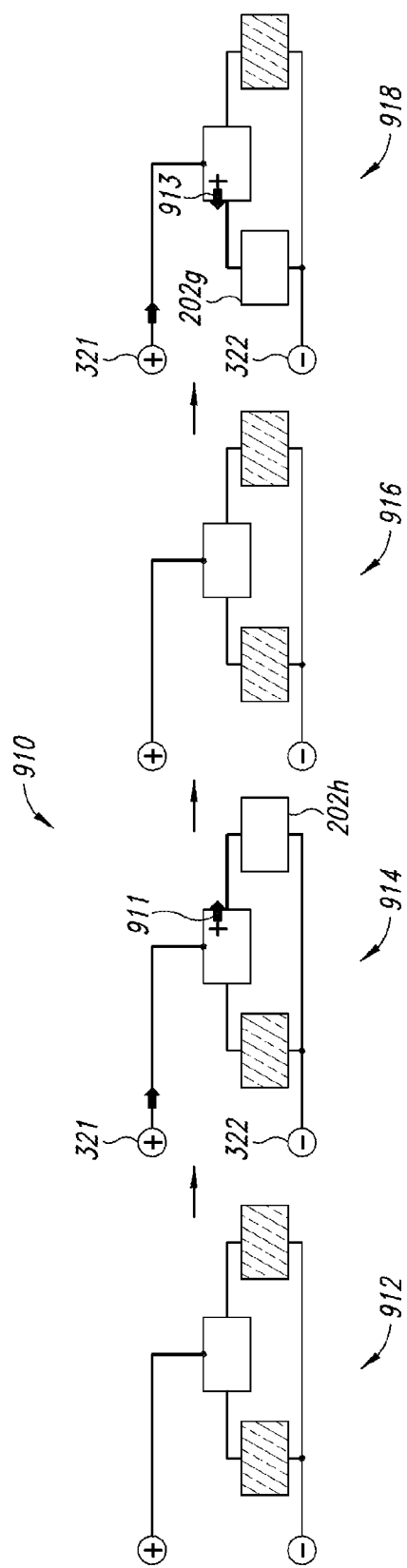
FIG. 9A
FIG. 9B

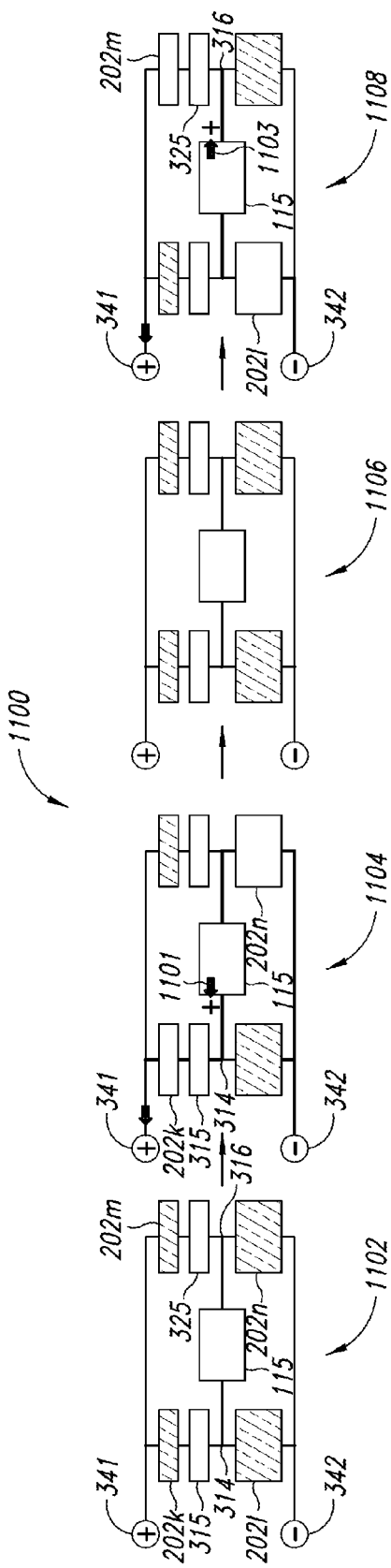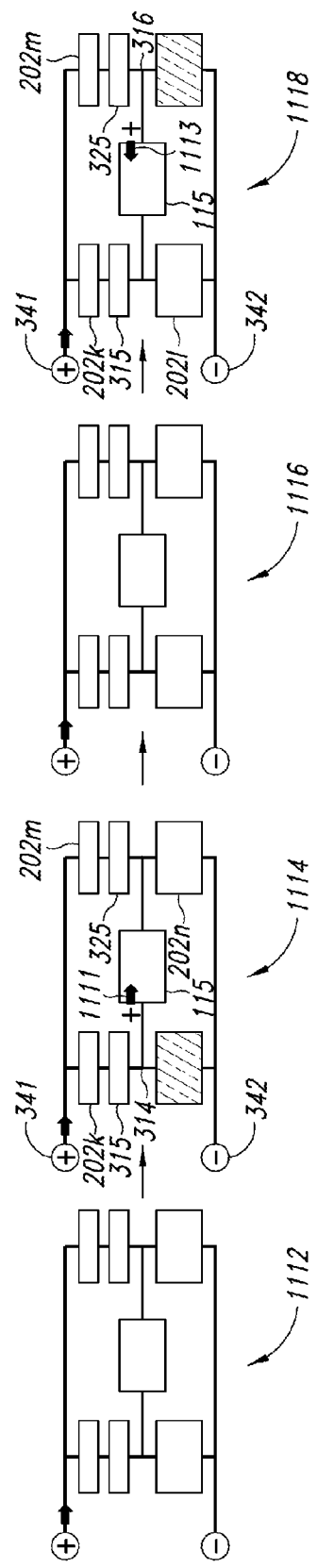
FIG. 11A
FIG. 11B

WIRELESS POWER TRANSMITTING/RECEIVING DEVICES AND METHODS

BACKGROUND

Technical Field

The present application is generally related to wireless power transmitting and receiving devices and methods, and in particular, but not exclusively to, power share controller modules being operable to both transmit and receive wireless power.

Description of the Related Art

Wireless power transfer typically involves two devices, each having a dedicated function: a transmitter or a receiver. For example, a cell phone may be charged from a wireless charger where the charger includes a power transmitting circuit and the cell phone includes a power receiving circuit. These wireless chargers are sometimes referred to as near field communication chargers.

The wireless transmitters are connected to a power source and convey energy wirelessly to one or more receivers, where the energy is then converted back to an electrical current and stored or utilized. In many wireless power applications, power is transferred by magnetic fields using magnetic inductive coupling between two coils of wire: a transmitter coil and a receiver coil. An alternating current (AC) through the transmitter coil creates an oscillating magnetic field, which passes through the receiving coil and induces an AC current in the receiver. The induced alternating current may either drive the load directly, or be rectified to direct current (DC) by a rectifier in the receiver.

FIG. 1 is a block diagram illustrating a conventional wireless power transfer system 10 where a wireless power transmitting device 1 is plugged into a wall and is configured to provide power to a wireless power receiving device 2, such as a cell phone. The wireless power transmitting device 1 includes a pulse-width modulated power signal generator 12, a tuning network 14, and an inductive coil 16. The wireless power transmitting device 1 receives power, for example, from a power plug 18 which may be plugged into a power outlet. The pulse-width modulated power signal generator 12 generates, from the power received through the power outlet, a pulse-width modulated power signal, which is supplied to the tuning network 14 and the inductive coil 16.

The wireless power receiving device 2 includes an inductive coil 26, a tuning network 24, and a rectifier 22. The inductive coil 16 of the transmitting device induces a current in the inductive coil 26 of the wireless power receiving device 2. The current is provided to the tuning network 24 and to the rectifier 22. The rectifier 22 rectifies the received, induced current, and provides a DC or near-DC charging current to one or more batteries 28.

The wireless power receiving device 2 may be included in, for example, a mobile or handheld computing device, such as cellphones, digital music players, or portable computers. In such a case, the receiving device may be recharged via the wireless power system 10; however, the transmitting device must be tethered to a wall plug or similar power outlet. A power outlet is still needed for the wireless power transmitting device 1, in order to transmit power to the receiving device 2.

BRIEF SUMMARY

The present disclosure provides wireless power sharing devices, systems and methods employing a configurable power share controller module. The power share controller module is a configurable circuit that includes a plurality of switches, one or more current or voltage sensors and a controller for controlling the operation of the plurality of switches. By controlling the operation of the switches, a variety of circuit configurations (both for transmitting as well as receiving power) may be achieved through a single power share controller module.

In an embodiment, the present disclosure provides a wireless power transmitting/receiving device that includes a power transmitting/receiving element, a plurality of switches, each of the plurality of switches having a control terminal and a conduction terminal, the conduction terminal being coupled to the power transmitting/receiving element, a current sensor configured to sense a current through the power transmitting/receiving element, and a controller coupled to the current sensor and the plurality of switches, the controller being configured to control the plurality of switches based on the sensed current. In an alternative embodiment, the switches may be controlled based on a sensed voltage.

In another embodiment, a method of controlling a power share controller module is provided, the power share controller module being operable to transmit power in a power transmitting mode, and to receive power in a power receiving mode, the method including: sensing a current through a power transmitting/receiving element; and controlling the plurality of switches based on the sensed current, the plurality of switches being coupled to the power transmitting/receiving element. In the power receiving mode, controlling the plurality of switches includes: controlling the plurality of switches, based on the sensed current, to generate a rectified power signal. In the power transmitting mode, controlling the plurality of switches includes: controlling the plurality of switches to generate a pulse-width modulated (PWM) power signal.

In another embodiment, a wireless power transmitting and receiving circuit is provided that includes an inductive coil, a plurality of switches, each of the plurality of switches having a control terminal and a conduction terminal, the conduction terminal being coupled to the inductive coil, and a current sensor configured to sense a current through the inductive coil. In a power receiving mode, the circuit is configured to generate a rectified power signal. In a power transmitting mode, the circuit is configured to generate a pulse-width modulated (PWM) power signal.

BRIEF DESCRIPTION OF THE SEVERAL VIEWS OF THE DRAWINGS

Embodiments of the present application will now be described with reference to the following figures in which:

FIGS. 7A-7C are flow-charts illustrating processes for controlling a power share controller module configured as a full H-bridge, class D circuit when operated in power receiving and power transmitting modes;

FIGS. 9A and 9B are flow-charts illustrating processes for controlling a power share controller module configured as a center-tap coil circuit, high-side alternative when operated in power receiving and power transmitting modes;

FIGS. 11A and 11B are flow-charts illustrating processes for controlling a power share controller module configured as a modified current-mode, class D circuit when operated in power receiving and power transmitting modes.

DETAILED DESCRIPTION

As discussed in the Background section, above, wireless power transfer typically involves a dedicated power transmitter circuit (e.g., in the power transmitter device), and a dedicated power receiver circuit (e.g., in a power receiver device), where the transmitter circuit is coupled to a power outlet. The present disclosure provides several wireless power sharing devices and methods which include power transmitting and power receiving functionality in a single power share controller module, i.e., the module is within a single device, such as a cell phone. The cell phone can be wirelessly charged through known methods, such as with a power transmitting device that is tethered to a power outlet or may be charged by positioning the phone on laptop that is configured to wirelessly transmit power. The cell phone can also transmit power to a second mobile device, like a smart watch or wireless headphones. As more and more users start using wearable devices, the issue will be how to keep the wearable devices powered. The present disclosure is directed to a module that can be incorporated in any electronic device that will allow the electronic device to be wirelessly charged and wirelessly transmit power to a second device.

The power share controller module is configurable, via a plurality of switches controlled by a controller, to act in a power receiving mode (rectifying received power from a power transmitter) and in a power transmitting mode (transmitting a pulse-width modulated (PWM) power signal). The power share controller module may be configured in the power receiving mode or the power transmitting mode based on, for example, a user's selection of a transmitting or receiving mode. That is, a wireless power sharing device including the power share controller module may include a button, switch, graphical user interface icon or any other such input mechanism allowing a user to initiate power sharing to or from the device in either a power receiving or a power transmitting operational mode.

Figure 1:
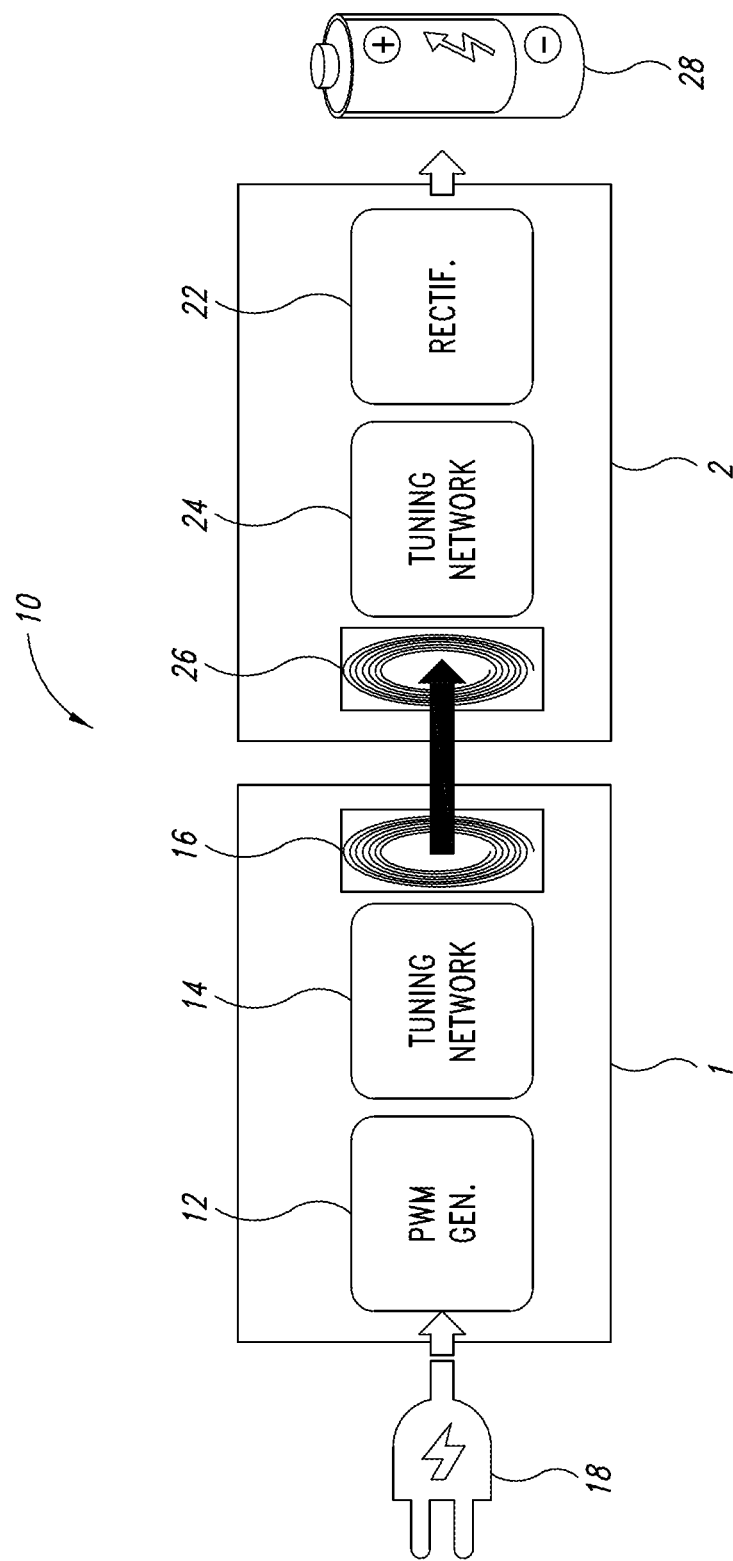
FIG. 1 is a block diagram illustrating a conventional wireless power transfer system.
Figure 2:
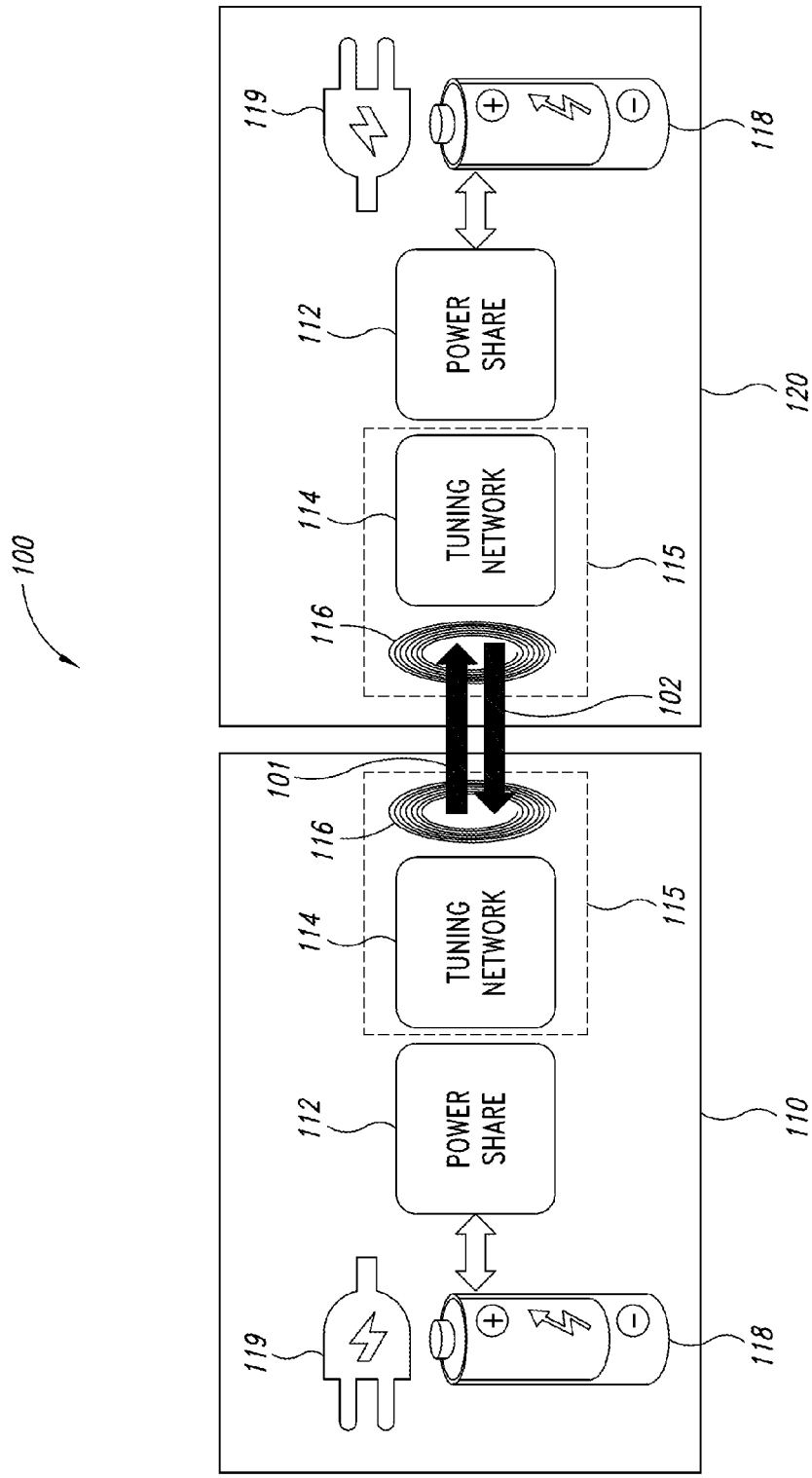
FIG. 2 is a block diagram illustrating a wireless power sharing system, in accordance with embodiments of the present disclosure.

FIG. 2 is a block diagram illustrating a wireless power sharing system 100, in accordance with embodiments of the present disclosure. The wireless power sharing system 100 includes first and second wireless power transmitting/receiving devices 110, 120, respectively. The first and second devices 110, 120 may be, for example, mobile or handheld computing devices, such as cellphones, digital music players, portable computers, or tablets. When in use, a user will be able to charge their cell phone by simply laying their cell phone on their tablet. When both devices are in power sharing mode, the tablet may be able to wirelessly charge a battery of the cell phone. The tablet may be sharing its power coming directly from an outlet or if the tablet is running off a battery, i.e. not currently plugged in, the tablet may charge the battery of the cell phone from its own battery.

The first and second devices 110, 120 may include the same power transmitting/receiving circuit elements, i.e. the same circuitry is made by the manufacturer and can function as both a power transmitter and a power receiver in a single chip. A single chip may be included in the first and second devices such that there is flexibility in how each device is used. Each of the first and second devices 110, 120 include a coil 116, a tuning network 114, and a power share controller module 112. The tuning network includes a plurality of capacitors and at least one inductor that store energy for the transmission and reception of power. The tuning network can change the peak resonance to achieve efficient power transmission. The tuning network allows for matching the frequency of the transmission and reception signals.

A power transmitting/receiving element 115 includes the coil 116 and the tuning network 114. The first and second devices 110, 120 may further include a power source, such as a battery 118 and/or a power plug 119.

The power share controller module 112 (which will be described in further detail below) is a configurable circuit that enables the devices 110, 120 to be operated in either of two modes: a power receiving mode, and a power transmitting mode. For example, as shown by the arrow 101, the first device 110 may be operated as a power transmitter, while the second device 120 may be operated as a power receiver. As shown by the arrow 102, the direction of power flow between the first and second devices 110,120 may be reversed with respect to the arrow 101. That is, the first device 110 may be operated as a power receiver, while the second device 120 may be operated as a power transmitter. There is communication besides just the transmitted power between the first and second devices 110, 120, to transmit relevant information about each device, such as to avoid overheating and to provide energy need information (i.e., how much power the receiving device needs to fill its battery). In some embodiments, the first device will ping the second device to determine which device has more power, this would be potentially without input from the user. Alternatively, the user could override the default and choose to provide the lower power device's power to the other device.

When the first device is in power transmitting mode, the power share controller module 112 of the first device 110 provides an alternating current to the power transmitting/receiving element 115, which creates an oscillating magnetic field from the coil. The power for generating the alternating current may be provided, for example, from the power plug 119 or from the batteries 118. If the power is provided from the batteries, a DC voltage source, the power share controller module 112 of the first device 110 generates the alternating current. The oscillating magnetic field induces an alternating current in the power transmitting/receiving element 115 of the second device 120. The power share controller module 112 of the second device 120, in such a case, is operatively configured to rectify the received alternating current to a direct current (DC), which may be used to power the second device 120 or charge the batteries 118 of the second device 120.

When the second device is in the power transmitting mode and the first device is in the power receiving mode, the power share controller module 112 of the second device 120 provides an alternating current to the power transmitting/receiving element 115 to induce an alternating current in the power transmitting/receiving element 115 of the first device 110. The power share controller module 112 of the first device 110, in such a case, is operatively configured to rectify the received alternating current to a direct current (DC), which may be used to power the first device 110 or charge the batteries 118 of the first device 110. Each of the devices is configured to receive power directly from the standard power outlet as well as to be charged or provide power "on the go," when the user doesn't have access to a wall outlet.

Figure 3:
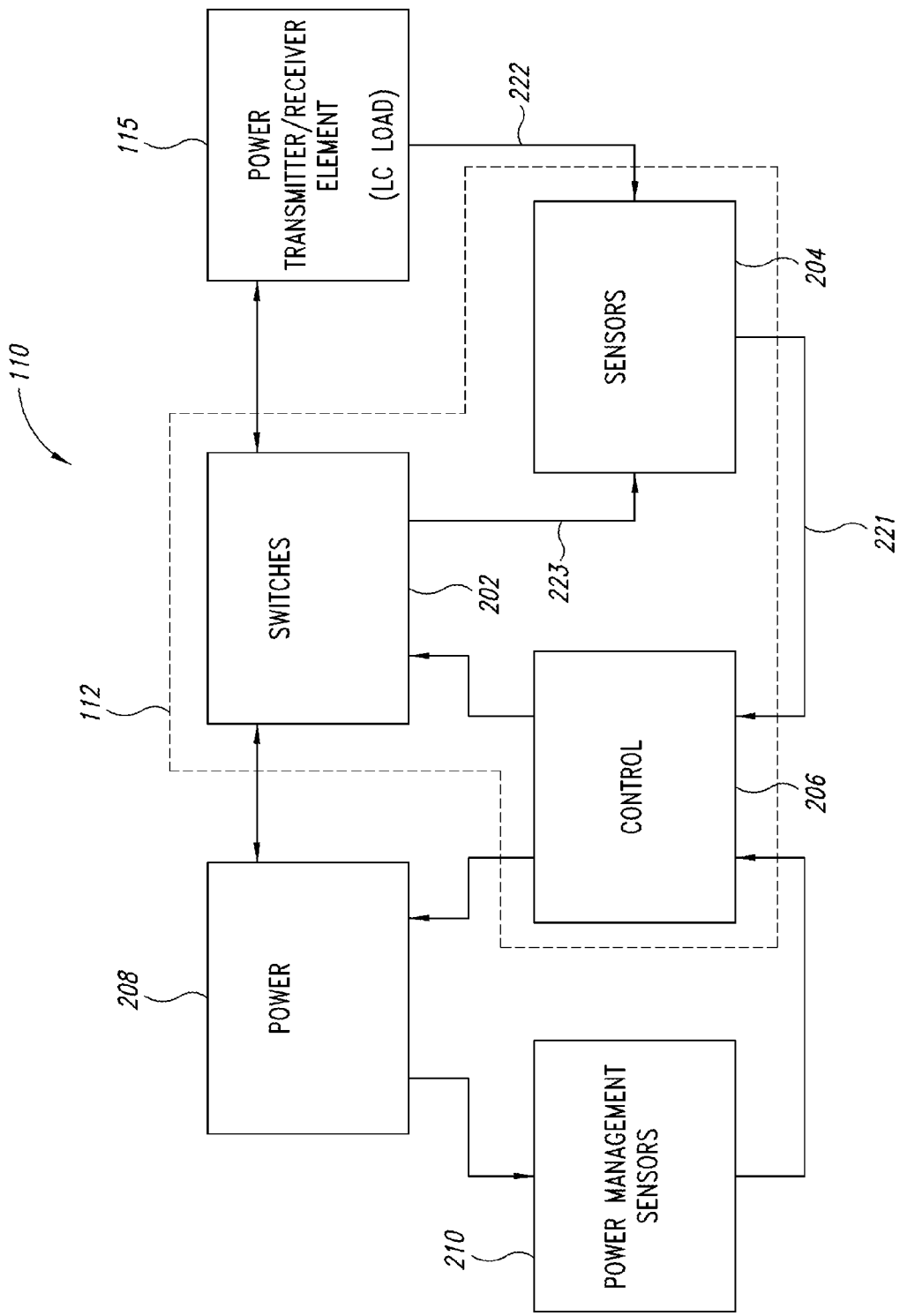
FIG. 3 is a block diagram illustrating further details of a wireless power transmitting/receiving device of the wireless power sharing system of FIG. 2, in accordance with embodiments of the present disclosure.

FIG. 3 is a block diagram illustrating further details of the wireless power transmitting/receiving devices 110, 120, in accordance with one or more embodiments. Each of the wireless power transmitting/receiving devices 110, 120 includes the power share controller module 112, the power transmitting/receiving element 115 and further may include a power management block 208 and a power management sense block 210.

The power share controller module 112 includes switches 202, sensors 204 and a controller 206. The controller 206 controls the operation of the switches 202 based at least in part on signals 221 received from the sensors 204. The sensors 204 may include a variety of types of sensors to sense current and/or voltage throughout the power share controller module 112 and the power transmitting/receiving element 115. For example, the sensors 204 may include sensors for sensing an absolute or differential voltage across the power transmitting/receiving element 115 (e.g., via sense signal 222) or the switches 202 (e.g., via sense signal 223). Additionally or alternatively, the sensors 204 may include sensors for sensing a high-side or low-side current in the power share controller module 112.

As shown in FIG. 3, the switches 202 are coupled to the power transmitting/receiving element 115, and are arranged about the power transmitting/receiving element 115 in such a way that the device 110 can selectively operate as a power transmitter or a power receiver. For example, the switches 202 may be arranged about the power transmitting/receiving element 115 in such a way as to form an H-bridge (as will be discussed in further detail herein).

When the device 110 is in the power receiving mode of operation, the power transmitting/receiving element 115 receives an induced alternating current (e.g., from the coil of a second device, which may also be a power transmitter or a power transmitting/receiving device). The power share controller module is configured to determine when the element 115 is receiving power, such as through the sensors 204. The induced current is provided to the switches 202. The sensors 204 are coupled between the element 115 and the switches and the sensors are configured to sense the induced current, e.g., by sensing a current through the power transmitting/receiving element 115 via sense signal 222, by sensing a voltage across one or more of the switches 202 via sense signal 223, or by sensing a high-side or low-side current of the switches.

The sensors 204 provide a sense signal 221 to the controller 206, which determines that the device 110 is receiving power, and which controls the operation of the switches 202 to rectify the received power and to provide the rectified power to the power management block 208. The power management block 208 may include, for example, current and voltage conversion and regulation circuitry to provide a regulated power output to power the device 110. The controller 206 may control the operation of the power management block 208 based on, for example, sense signals provided from the power management sense block 210.

When the device 110 is in a power transmitting mode of operation, the controller 206 controls the operation of the switches 202 to provide power from the power management block 208 to the power transmitting/receiving element 115. Through control of the switches 202, an alternating current is delivered to the power transmitting/receiving element 115 to induce a current in the coil of a power receiving device.

Figure 4A:
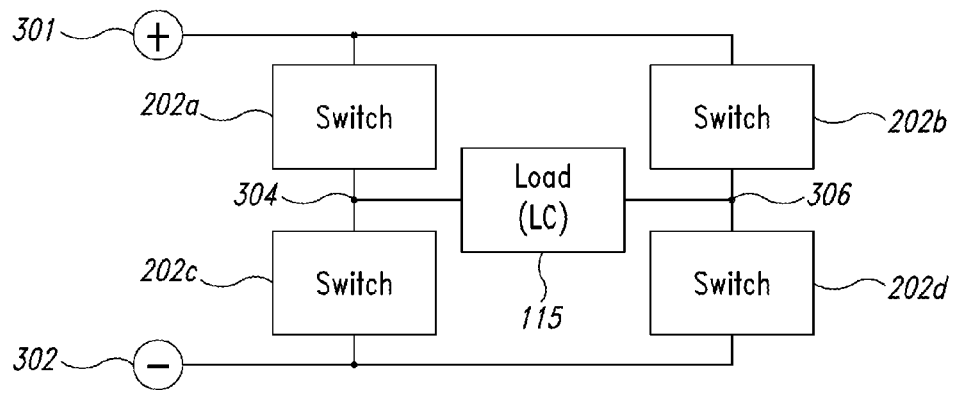
FIGS. 4A-4E provide several block diagrams illustrating a variety of possible configurations of switches and a power transmitting/receiving element of FIG. 3, in accordance with embodiments of the present disclosure.

FIGS. 4A-4E provide several block diagrams illustrating a variety of configurations of the switches 202 and the power transmitting/receiving element 115, in accordance with embodiments provided herein. As shown in FIG. 4A, the switches 202 may be arranged about the power transmitting/receiving element 115 in such a way as to form a full H-bridge circuit. Such configurations are sometimes referred to as class D circuits. The switches 202 include a first transistor 202a, a second transistor 202b, a third transistor 202c and a fourth transistor 202d arranged in an H-bridge having a high-side terminal 301 and a low-side terminal 302. The first and second transistors 202a, 202b each have a first conduction terminal coupled to the high-side terminal 301. The third and fourth transistors 202c, 202d each have a first conduction terminal coupled to the low-side terminal 302. The first and third transistors 202a, 202c have respective second conduction terminals coupled to a first terminal of the power transmitting/receiving element 115 at node 304. The second and fourth transistors 202b, 202d have respective second conduction terminals coupled to a second terminal of the power transmitting/receiving element 115 at node 306.

Figure 4B:
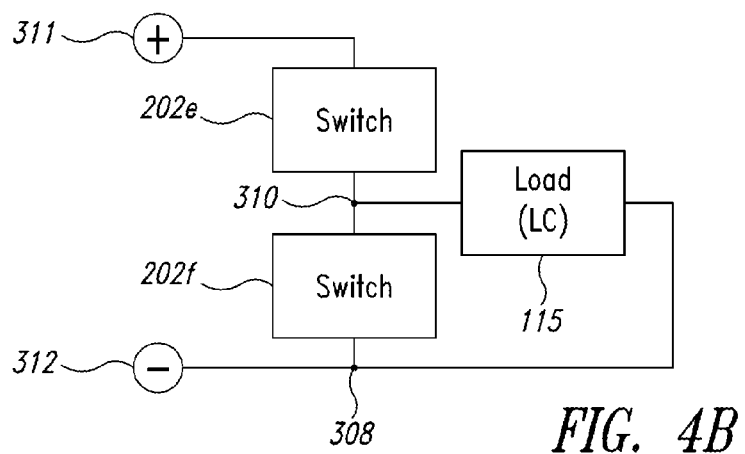

In another embodiment, shown in FIG. 4B, the switches 202 may be arranged about the power transmitting/receiving element 115 in such a way as to form a half H-bridge, voltage-mode circuit. This arrangement may also be categorized as a class D (with zero voltage switching (ZVS) option) circuit. The switches 202 include a first transistor 202e and a second transistor 202f arranged in a half H-bridge having a high-side terminal 311 and a low-side terminal 312. The first transistor 202e has a first conduction terminal coupled to the high-side terminal 311, and the second transistor 202f has a first conduction terminal coupled to the low-side terminal 312 and to a first terminal of the power transmitting/receiving element 115 at node 308. The first and second transistors 202e, 202f each have second conduction terminals coupled to a second terminal of the power transmitting/receiving element 115 at node 310.

Figure 4C:
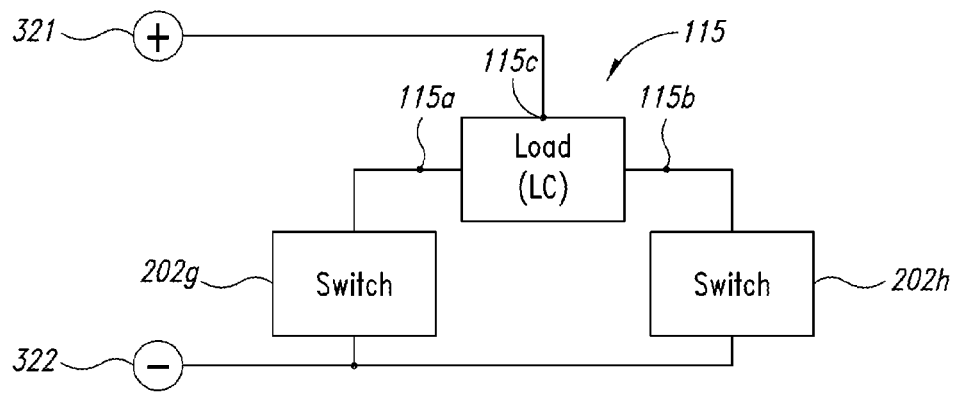

In another embodiment, shown in FIG. 4C, the power transmitting/receiving element 115 may be a center-tap load coil, and the switches 202 may be arranged in such a way as to form a center-tap load coil circuit. The center-tap coil includes a first terminal 115a, a second terminal 115b and a center-tap terminal 115c. The switches 202 include a first transistor 202g and a second transistor 202h. The first transistor 202g has a first conduction terminal coupled to the first terminal 115a of the center-tap coil, and the second transistor 202h has a first conduction terminal coupled to the second terminal 115b of the center-tap coil. The second conduction terminals of the first and second transistors 202g, 202h are coupled to the low-side terminal 322. The center-tap terminal 115c of the center-tap coil is coupled to the high side terminal 321.

The center-tap load coil circuit of FIG. 4C is a high-side alternative (i.e., the coil is center-tapped on the high-side of the circuit); however, it should be readily understood that the center-tap load coil circuit may be a low-side alternative, e.g., by reversing the low (−) and high (+) terminals.

Figure 4D:
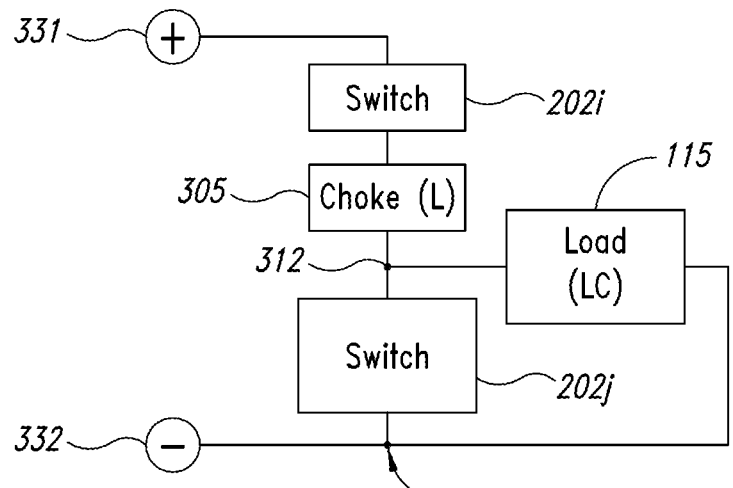

In another embodiment, shown in FIG. 4D, the switches 202 may be arranged about the power transmitting/receiving element 115 in such a way as to form a modified circuit that includes an inductive choke 305. Such an arrangement may be classified as a class E/F circuit. The inductive choke 305 has a first terminal coupled to a first terminal of the power transmitting/receiving element 115 at node 312.

The switches 202 include a first transistor 202i and a second transistor 202j. The first transistor 202i has a first conduction terminal coupled to a second terminal of the inductive choke 305, and a second terminal coupled to the high-side terminal 331. The second transistor 202j has a first conduction terminal coupled to the first terminal of the power transmitting/receiving element 115 and to the first terminal of the inductive choke 305 at node 312. A second conductive terminal of the second transistor 202j is coupled to a second terminal of the power transmitting/receiving element 115 and the low-side terminal 332 at node 314.

Figure 4E:
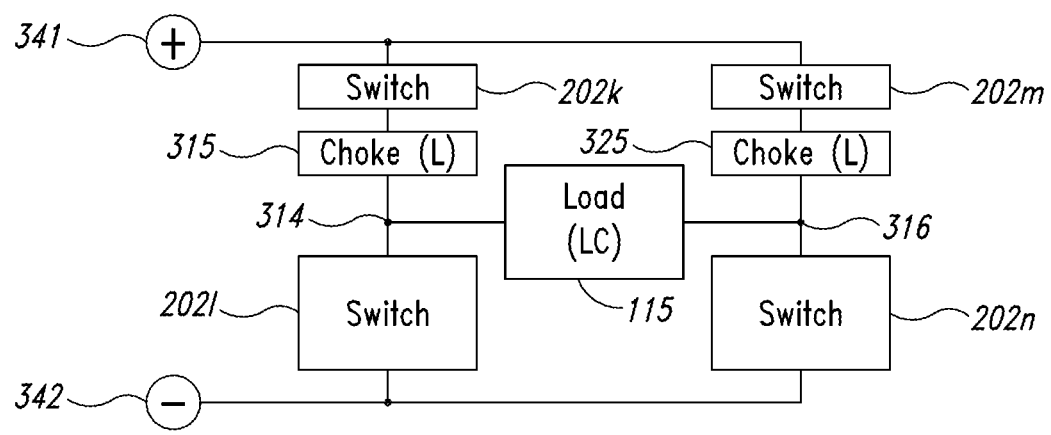

In yet another embodiment, shown in FIG. 4E, the switches 202 may be arranged about the power transmitting/receiving element 115 in such a way as to form a modified current-mode class D circuit that includes a first inductive choke 315 and a second inductive choke 325. The first inductive choke 315 has a first terminal coupled to a first terminal of the power transmitting/receiving element 115 at node 314, and the second inductive choke 325 has a first terminal coupled to a second terminal of the power transmitting/receiving element 115 at node 316.

The switches 202 include a first transistor 202k, a second transistor 202l, a third transistor 202m and a fourth transistor 202n. The first transistor has a first conduction terminal coupled to a second terminal of the first inductive choke 315, and a second conduction terminal coupled to the high-side terminal 341. The second transistor 202l has a first conduction terminal coupled to the first terminal of the power transmitting/receiving element 115, and to the first terminal of the first inductive choke 315, at node 314. The third transistor 202m has a first conduction terminal coupled to a second terminal of the second inductive choke 325, and a second conduction terminal coupled to the high-side terminal 341. And, the fourth transistor 202n has a first conduction terminal coupled to the second terminal of the power transmitting/receiving element 115, and to the first terminal of the second inductive choke 325, at node 316.

Figure 5:
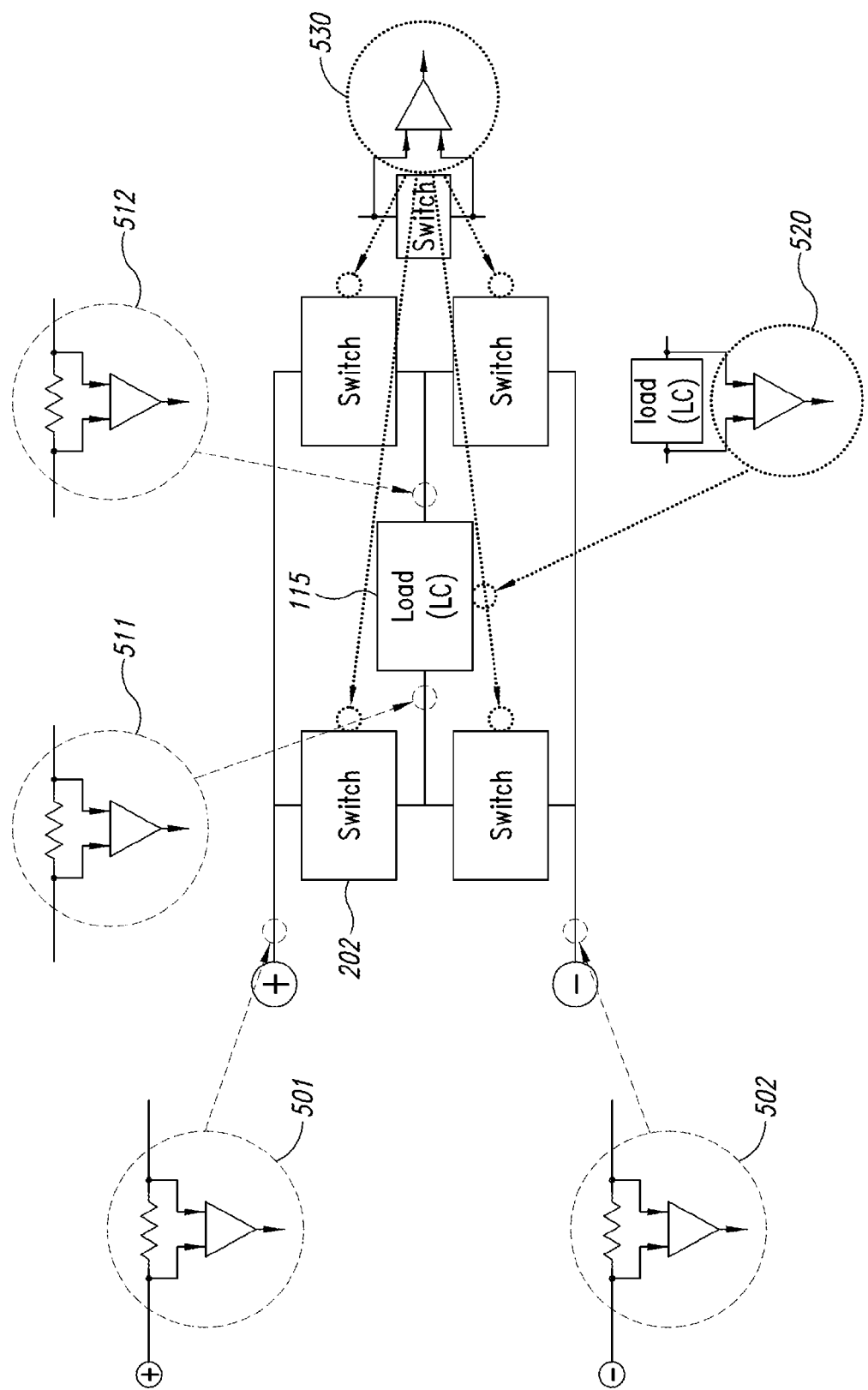
FIG. 5 is a block diagram illustrating current and voltage sensors which may be included in a power share controller module, in accordance with embodiments of the present disclosure.

FIG. 5 is a block diagram illustrating current and voltage sensors which may be included, for example, in the sensors 204 of the power share controller module 112. As shown in FIG. 5, the power share controller module 112 may include switches 202 and power transmitting/receiving element 115 arranged as an H-bridge (for example, as shown described with respect to FIG. 4A). However, it should be readily appreciated that the sensors shown in FIG. 5 may similarly be included in any of the other possible configurations of the power share controller module 112, including, for example, those shown in FIGS. 4B-E.

The sensors 204 provide current and voltage sensing signals which informs the operation of the power share controller module 112. The energy flow through each device, such as the first and second device, is constantly monitored during the power transmission and reception with one or more of these sensors. It is possible that all of these sensors are included in the chip so that the chip can be used in a variety of potential use cases. For example, in a power receiving mode, the sensors 204 provide current and voltage signals to the controller 206. Based on the received sensing signals, the controller 206 may determine how and when to control the switches 202 in order to rectify the received power. The sensors 204 may include one or more load current sensors 511, 512, which sense a current through the power transmitting/receiving element 115. As shown in FIG. 5, the load current sensors 511, 512 may be provided on either side of the power transmitting/receiving element 115. The current load sensors 511, 512 include a resistor and a comparator, which form a differential measure current sensor.

The sensors 204 may further include a high-side current sensor 501 or a low-side current sensor 502 for sensing a current through the high- and low-side terminals of the power share controller module 112. The high-side current sensor 501 may have a large common mode, but little charge injection noise. The low-side current sensor 502 may have a small common mode, but some injection noise. The load current sensors 511, 512 and the high- and low-side current sensors 501, 502 may be any type of current sensor (e.g., a differential measure current sensor, as shown, or an absolute measure current sensor).

The sensors 204 may further include one or more voltage sensors. For example, the sensors 204 may include a load voltage sensor 520 that is configured to sense a voltage across the power transmitting/receiving element 115. Additionally, one or more switch voltage sensors 530 may be included in the sensors 204 for sensing a voltage across the switches 202. The load voltage sensor 520 and the switch voltage sensors 530 may be any type of suitable voltage sensor (e.g., a differential measure voltage sensor, as shown, or an absolute measure voltage sensor).

Referring again to FIG. 3, the sensors 204 provide a sense signal 221 to the controller 206, which controls the operation of the switches 202 based on the sense signal 221. In the most general case, a single load current sensor 511 or 512 is included in the power share controller module 112. In such a case, the controller 206 can determine a direction of the current through the power transmitting/receiving element 115 based on the sense signal 221 provided by the load current sensor 511 or 512. The controller 206 controls the operation of the switches 202 accordingly, as will be discussed in further detail herein with respect to FIGS. 7-11.

While a single load sensor 511 or 512 may be included in the most general case, other configurations are possible to provide a sense signal 221 which allows the controller 206 to sufficiently control the switches 202 in order to transmit and/or receive and rectify power. For example, in the H-bridge configuration shown in FIG. 5, the power share controller module 112 may include only four switch voltage sensors (one for each switch 202). Additional sensors (such as, for example, the high-side and low-side current sensors 501, 502, and the load voltage sensor 520) may be included in the power share controller module 112, and can improve the performance of the power share controller module 112. For example, providing the switch voltage sensors 530 (e.g., in addition to one or more load current sensors 511, 512) helps the controller 206 to determine how much power is needed (when operating the power share controller module 112 in a power receiving mode). This may be communicated to the power transmitting device (which may be, for example, a device including a power share controller module 112), such that the power transmitter only transmits as much power as is needed by the receiving device.

The sensors may also be used to operate the H-bridge in one of the variety of embodiments discussed in more detail below, such as FIG. 8B where only two of the switches are utilized.

Figure 6:
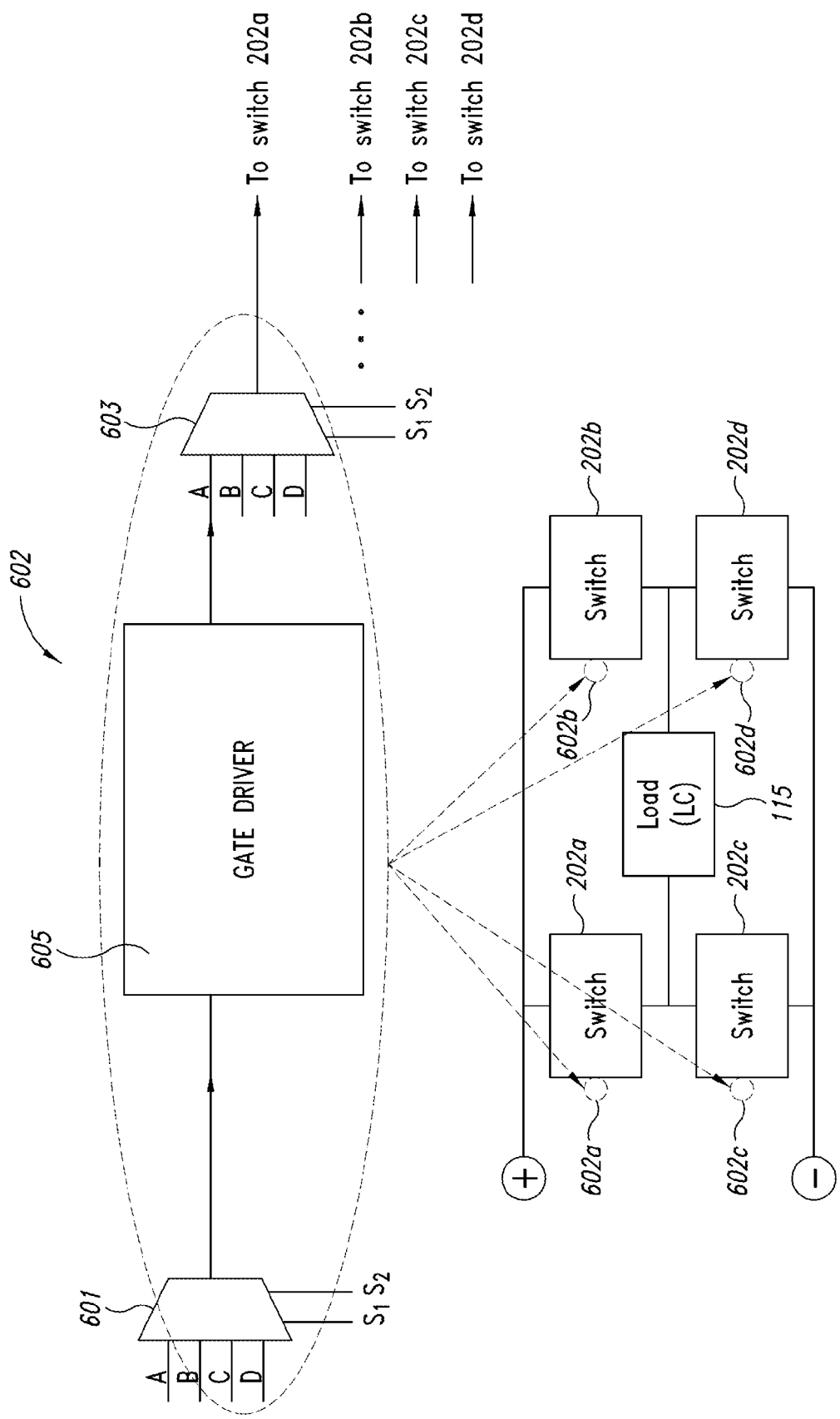
FIG. 6 is a block diagram illustrating an arrangement of switch drivers which may be included in power share controller modules, in accordance with embodiments of the present disclosure.

FIG. 6 is a block diagram illustrating an arrangement of switch drivers 602a-d included in the power share controller module 112. As shown in FIG. 6, the power share controller module 112 includes switches 202a-d and power transmitting/receiving element 115 arranged as an H-bridge (for example, as shown described with respect to FIG. 4A). It should be readily appreciated, however, that the switch drivers shown in FIG. 6 may similarly be included in any of the other possible configurations of the power share controller module 112, including, for example, those shown in FIGS. 4B-E. Also, the H-bridge may simply be used in the configurations of FIGS. 4B-E such that the single chip can be used in a variety of contexts.

Each switch 202a-d of the power share controller module 112 includes a switch driver 602a-d, respectively, as shown. As shown by numeral 602, each of the switch drivers 602a-d include an analog switch driver 605 (a gate driver), and one or both of a digital multiplexer 601 and an analog multiplexer 603. The driver translates the digital command to an analog command. Said differently, each switch has two multiplexers and a driver associated with it.

The digital multiplexer 601 includes four inputs and to selection inputs S1, S2. The digital multiplexer 601 receives at one input (e.g., input A) a logic signal from the controller 206, for example, a signal indicating that the associated switch should be closed (e.g., for receiving and rectifying power). Input A is the digital drive signal from the controller, the typical situation.

At another input (e.g., input B), the digital multiplexer 601 receives a logic signal from a comparator associated with the switch to be driven. For example, the switches 202a-d may, as one of several possible configurations, be configured as a sync rectifier (made by ideal diodes), in which case each of the switches 202a-d would have an associated comparator having input terminals connected to respective conduction terminals of the switch, and an output terminal of the comparator being connected to the gate or control terminal of the switch through the digital multiplexer (e.g., through selection of input B). The comparator would determine if the signal is above or below a threshold amount and if so, activate or deactivate the associated switch. To implement the sync rectifier circuit configuration, input B would be selected (for each switch driver 602) to be passed through the digital multiplexer 601 and to the associated analog switch driver 605, and thus each switch would be driven by the output of its associated comparator, as opposed to being driven based on a control signal output by the controller 206. Since both configurations may be possible (e.g., a circuit configuration where the switches 202a-d are driven by the controller 206, and a circuit configuration where the switches are driven by a comparator), the digital multiplexer 601 enables a selection of which signal is to be provided to the analog switch driver 605 (e.g., a selection of which of input signal A or B will be provided from the digital multiplexer 601 to the analog switch driver 605).

Another option is for the circuit to be configured in a self-driving active rectifier mode such that an input C is active on the multiplexers where an internal analog signal drives the module. The analog multiplexer 603 outputs the gate drive signal based on the internal analog signal that is already in the system. Input D may be associated with another analog drive signal that is different from the self-driving rectifier mode.

The analog multiplexer 603 is included in the switch driver 602 with the digital multiplexer 601. The analog multiplexer 603 may receive at one input (e.g., input A) an analog driving signal from the analog switch driver 605, e.g., for driving the switches 202 in a first mode of operation (e.g., based on control signals received from the controller 206). In such a case, each analog switch driver 605 (i.e., one for each of switches 202a-d) would be controlled by the controller 206, and the signal provided at input A of the analog multiplexer 603 (i.e., the driving signal from analog switch driver 605) would be selected (e.g., by controlling selection signals $S_1$ and $S_2$ in order to select input A), and would be provided at the output of the analog multiplexer 603 to drive an associated switch 202.

In a second mode of operation, however, it may be desirable to drive the switches 202 based on, for example, the outputs from respective comparators associated with the switches 202 (e.g., to implement a sync rectifier). For example, to implement the sync rectifier, each switch 202a-d may be driven by the output of its associated comparator by providing the comparator output to a second input (e.g., input B) of the analog multiplexer 603. Thus, by enabling the second input (input B) to be passed through the analog multiplexer 603 (e.g., by controlling selection signals $S_1$ and $S_2$ in order to select input B), the switches 202a-d would be driven by their respective associated comparator outputs, as opposed to being driven based on a control signal output by the controller 206 and provided to the analog switch driver 605.

The analog switch drivers 615 may be analog push/pull switch drivers to increase the switching speed of the switches 202a-d. Further, the high-side switch drivers 602a, 602b may include a bootstrap drive, for example, for driving high-side switches 202a, 202b which may be NMOS transistors. Additionally, the switch drivers 602a-d may include pull-up/pull-down logic for controlling a default state of the switches 202a-d (e.g., OPEN switch).

Each of the switch drivers 602a-d is coupled to a control terminal (i.e., a gate terminal) of a respective one of the switches 202a-d. The switch drivers 602a-d control the operation of the switches 202a-d based on control signals received from the controller 206.

FIGS. 7A-C are flow-charts illustrating processes for controlling a power share controller module 112 configured as a full H-bridge, class D circuit (shown, for example, in FIG. 4A) when operated in power receiving and power transmitting modes.

FIG. 7A is a flow-chart illustrating a process 700 for controlling the power share controller module 112 when receiving power (e.g., from a power transmitting device) to provide full wave rectification. At block 702, the process 700 begins with all of the switches 202a-d in an open state, as power has not been received through the power transmitting/receiving element 115. The open state is represented by the hatch pattern in the switch blocks.

At block 704, a voltage (+) is present at node 304, as current is induced through the power transmitting/receiving element 115 in the direction shown by arrow 701. Referring again to FIG. 5, the current and/or voltage may be sensed, for example, by either of the load current sensors 511 or 512, by the load voltage sensor 520, or by any other of the sensors 204. The sensors 204 provide a sense signal 221 to the controller 206, which controls the operation of the switches 202a-d based on the sense signal 221. As shown at block 704, based on the sensed current or voltage, the controller 206 controls the switches 202a-d such that the first and fourth switches 202a, 202d are closed, or in a conduction state. At the same time, the second and third switches 202b, 202c are open. Accordingly, a current path between the low-side terminal 302 and the high-side terminal 301 is formed through the power transmitting/receiving element 115 and the first and fourth switches 202a, 202d.

At block 706, all of the switches 202a-d may be returned to an open state, as no current or voltage is sensed through the power transmitting/receiving element 115. That is, no power is being received by the power share controller module 112 at block 706.

At block 708, a voltage (+) is present at node 306, as current is induced through the power transmitting/receiving element 115 in the direction shown by arrow 703. The current at block 708 (shown by arrow 703) flows in the opposite direction as the current at block 704 (shown by arrow 701), as power is received by the power transmitting/receiving element from an oscillating magnetic field created by an alternating current through the coil of the power transmitting device. The current and/or voltage is sensed by the sensors 204, which provide a sense signal 221 to the controller 206, as described above. As shown at block 708, based on the sensed current or voltage, the controller 206 controls the switches 202a-d such that the second and third switches 202b, 202c are closed, while the first and fourth switches 202a, 202d are open. A current path between the low-side terminal 302 and the high-side terminal 301 is thus formed through the power transmitting/receiving element 115 and the second and third switches 202b, 202c.

Blocks 702 through 708 of FIG. 7A thus illustrate the process for controlling the power share controller module 112 when receiving power through a full wave cycle from the power transmitting device. The process returns to block 702 at the completion of each full wave cycle, thereby producing a full wave rectification. The rectified power be provided to the power management block 208, and may thus be used to power a device connected to the power share controller module 112 (such as, for example, first or second devices 110, 120 shown in FIG. 2) or to recharge the batteries 118 of such a device.

FIG. 7B is a flow-chart illustrating a process 710 for controlling the power share controller module 112 when transmitting power (e.g., to a power receiving device) to provide a full-amplitude, two-level pulse-width modulated (PWM) power transmission signal (e.g., +1V, −1V). At block 712, the process 710 begins with all of the switches 202a-d in an open state.

At block 714, the controller 206 controls the switches 202a-d such that the first and fourth switches 202a, 202d are closed, and the second and third switches 202b, 202c are open. Accordingly, a current path between the high-side terminal 301 and the low-side terminal 302 is formed through the power transmitting/receiving element 115 and the first and fourth switches 202a, 202d. A voltage (+) is present at node 304, as current is provided through the power transmitting/receiving element 115 in the direction shown by arrow 711.

At block 716, all of the switches 202a-d may be returned to an open state, and no power is being transmitted by the power share controller module 112 at block 716.

At block 718, the controller 206 controls the switches 202a-d such that the second and third switches 202b, 202c are closed, while the first and fourth switches 202a, 202d are open. A current path between the high-side terminal 301 and the low-side terminal 302 is thus formed through the power transmitting/receiving element 115 and the second and third switches 202b, 202c. A voltage (+) is present at node 306, as current is provided through the power transmitting/receiving element 115 in the direction shown by arrow 713.

Blocks 712 through 718 of FIG. 7B thus illustrate a process for controlling the power share controller module 112 through a full power transmitting wave cycle. The process returns to block 712 at the completion of each full wave cycle, thereby generating a full-amplitude, two-level PWM power signal.

FIG. 7C is a flow-chart illustrating a process 720 for controlling the power share controller module 112 when transmitting power (e.g., to a power receiving device) to provide a full-amplitude, three-level pulse-width modulated (PWM) power transmission signal (e.g., +1V, 0V, −1V).

At block 722, the process 710 begins with the first and second switches 202a, 202b closed, while the third and fourth switches 202c, 202d are open. Block 722 is thus similar to block 712 of FIG. 7B, as no power is delivered through the power transmitting/receiving element 115; however, closing the first and second switches 202a, 202b at block 722, alleviates the potential for floating switches or nodes.

At block 724, the controller 206 controls the switches 202a-d such that the first and fourth switches 202a, 202d are closed, and the second and third switches 202b, 202c are open. Block 724 is the same as block 714 of FIG. 7B, described above.

At block 726, the third and fourth switches 202c, 202d are closed, while the first and second switches 202a, 202b are open. Block 726 is thus similar to block 716 of FIG. 7B, as no power is delivered through the power transmitting/receiving element 115; however, closing the third and fourth switches 202c, 202d at block 726, alleviates the potential for floating switches or nodes.

At block 728, the controller 206 controls the switches 202a-d such that the second and third switches 202b, 202c are closed, while the first and fourth switches 202a, 202d are open. Block 728 is the same as block 718 of FIG. 7B, described above.

The process 720 returns to block 722 at the completion of each full wave cycle, thereby generating a full-amplitude, three-level PWM power signal.

Figure 8A:
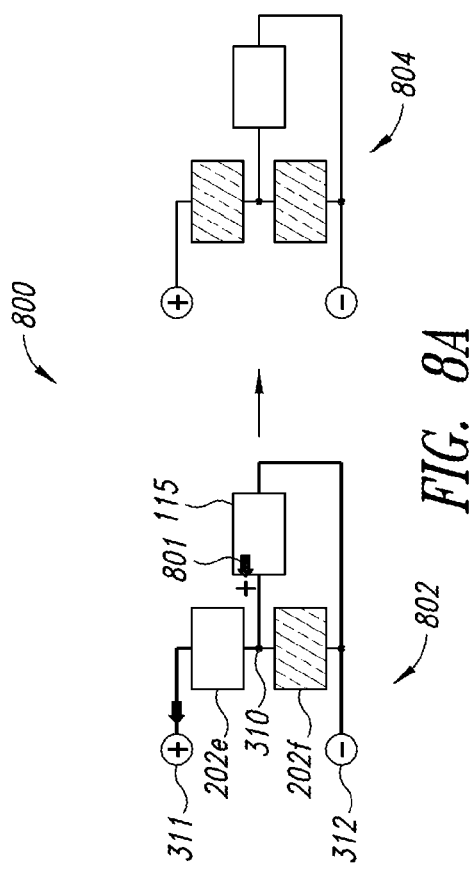
FIGS. 8A and 8B are flow-charts illustrating processes for controlling a power share controller module configured as a half H-bridge, voltage-mode class D circuit when operated in power receiving and power transmitting modes.
Figure 8B:
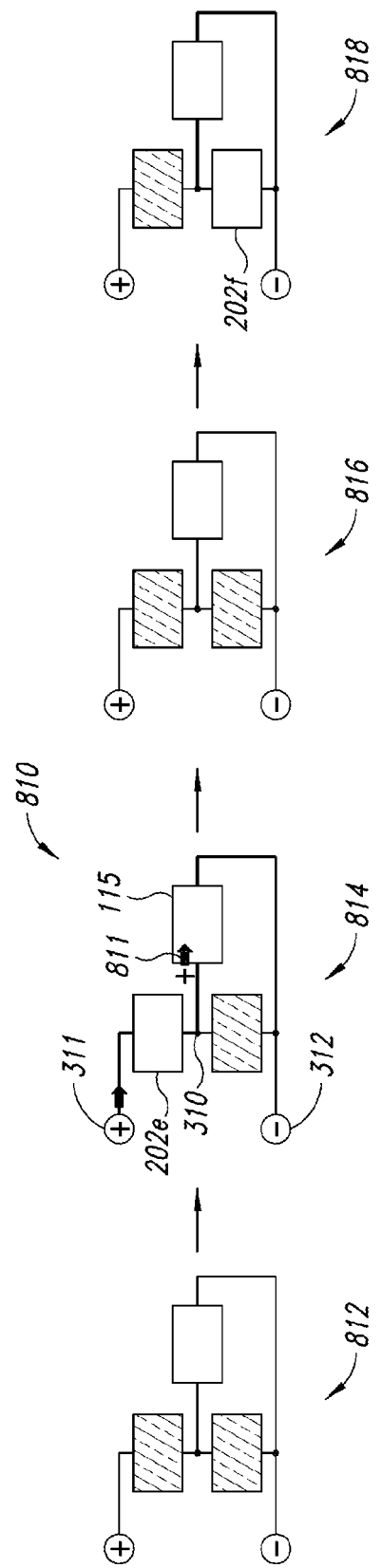

FIGS. 8A and 8B are flow-charts illustrating processes for controlling a power share controller module 112 configured as a half H-bridge, voltage-mode class D circuit (shown, for example, in FIG. 4B) when operated in power receiving and power transmitting modes.

FIG. 8A is a flow-chart illustrating a process 800 for controlling the power share controller module 112 when receiving power (e.g., from a power transmitting device) to provide half-wave rectification.

At block 802, a voltage (+) is present at node 310, as current is induced through the power transmitting/receiving element 115 in the direction shown by arrow 801. The current and/or voltage may be sensed by one or more of the sensors 204. The sensors 204 provide a sense signal 221 to the controller 206, which controls the operation of the switches 202e, 202f based on the sense signal 221. As shown at block 802, based on the sensed current or voltage, the controller 206 controls the switches 202e, 202f such that the first switch 202e is closed, and the second switch 202f is open. Accordingly, a current path between the low-side terminal 312 and the high-side terminal 311 is formed through the power transmitting/receiving element 115 and the first switch 202e.

At block 804, the first and second switches 202e, 202f are opened, as no current or voltage is sensed through the power transmitting/receiving element 115. That is, no power is being received by the power share controller module 112 at block 804.

The process 800 returns to block 802 at the completion of each wave cycle, thereby producing a half-wave rectification. The rectified power may be provided to the power management block 208, and may thus be used to power a device connected to the power share controller module 112 (such as, for example, first or second devices 110, 120 shown in FIG. 2) and/or to recharge the batteries 118 of such a device.

FIG. 8B is a flow-chart illustrating a process 810 for controlling the power share controller module 112 (arranged as a half H-bridge, voltage-mode class D circuit) when transmitting power (e.g., to a power receiving device) to provide a half-amplitude, two-level pulse-width modulated (PWM) power transmission signal (e.g., +1V, 0V). At block 812, the process 810 begins with the switches 202e, 202f in an open state.

At block 814, the controller 206 controls the switches 202e, 202f such that the first switch 202e is closed, and the second switch 202f is open. Accordingly, a current path between the high-side terminal 311 and the low-side terminal 312 is formed through the power transmitting/receiving element 115 and the first switch 202e. A voltage (+) is present at node 310, as current is provided through the power transmitting/receiving element 115 in the direction shown by arrow 811.

At block 816, the switches 202e, 202f are returned to an open state, and no power is being transmitted by the power share controller module 112 at block 816.

At block 818, the controller 206 controls the switches 202e, 202f such that the second switch 202f is closed, while the first switch 202e is open, thereby providing a 0V power signal through the power transmitting/receiving element 115.

The process returns to block 812 at the completion of each full wave cycle, thereby generating a half-amplitude, two-level PWM power signal.

FIGS. 9A and 9B are flow-charts illustrating processes for controlling a power share controller module 112 configured as a center-tap coil circuit, high-side alternative (shown, for example, in FIG. 4C), when operated in power receiving and power transmitting modes. The power transmitting/receiving element 115 is a center-tap coil, and the switches 202 include a first switch 202g and a second switch 202h.

FIG. 9A is a flow-chart illustrating a process 900 for controlling the power share controller module 112 when receiving power (e.g., from a power transmitting device) to provide full wave rectification. At block 902, the process 900 begins with the first and second switches 202g, 202h in an open state, as power has not been received through the power transmitting/receiving element 115.

At block 904, a voltage (+) is present at the center-tap node 115c, as current is induced through a portion of the power transmitting/receiving element 115 (i.e., between terminals 115b and 115c of the center-tap coil) in the direction shown by arrow 901. The current and/or voltage may be sensed by one or more of the sensors 204. The sensors 204 provide a sense signal 221 to the controller 206, which controls the operation of the switches 202g, 202h based on the sense signal 221. As shown at block 904, based on the sensed current or voltage, the controller 206 controls the switches 202g, 202h such that the first switch 202g is open, and the second switch 202h is closed. Accordingly, a current path between the low-side terminal 322 and the high-side terminal 321 is formed through the second switch 202h and a first portion of power transmitting/receiving element 115 (i.e., the portion between terminals 115b and 115c of the center-tap coil).

At block 906, the switches 202g, 202h are returned to an open state, as no current or voltage is sensed through the power transmitting/receiving element 115. That is, no power is being received by the power share controller module 112 at block 906.

At block 908, a voltage (+) is present at the center-tap node 115c, as current is induced through a second portion of the power transmitting/receiving element 115 (i.e., between terminals 115a and 115c of the center-tap coil) in the direction shown by arrow 903. The current and/or voltage is sensed by one or more of the sensors 204, and the controller 206 controls the operation of the switches 202g, 202h based on the sense signal 221. As shown at block 908, based on the sensed current or voltage, the controller 206 controls the switches 202g, 202h such that the first switch 202g is closed, and the second switch 202h is open. Accordingly, a current path between the low-side terminal 322 and the high-side terminal 321 is formed through the first switch 202g and a second portion of power transmitting/receiving element 115 (i.e., the portion between terminals 115a and 115c of the center-tap coil).

Blocks 902 through 908 of FIG. 9A thus illustrate a process for controlling the power share controller module 112 when receiving power through a full wave cycle from the power transmitting device. The process returns to block 902 at the completion of each full wave cycle, thereby producing a full wave rectification. The rectified power be provided to the power management block 208, and may thus be used to power a device connected to the power share controller module 112 (such as, for example, first or second devices 110, 120 shown in FIG. 2) and/or to recharge the batteries 118 of such a device.

FIG. 9B is a flow-chart illustrating a process 910 for controlling the power share controller module 112 when transmitting power (e.g., to a power receiving device) to provide a half-amplitude, two-level pulse-width modulated (PWM) power transmission signal (e.g., +1V, 0V). At block 912, the process 910 begins with both the first and second switches 202g, 202h in an open state.

At block 914, the controller 206 controls the switches 202g, 202h such that the first switch 202g is open, and the second switch 202h is closed. A current path between the high-side terminal 321 and the low-side terminal 322 is thus formed through the first portion of the power transmitting/receiving element 115 (i.e., the portion between terminals 115b and 115c of the center-tap coil) and the second switch 202h. A voltage (+) is present at the center-tap node 115c, as current is provided through the power transmitting/receiving element 115 in the direction shown by arrow 911.

At block 916, the switches 202g, 202h are returned to an open state, and no power is being transmitted by the power share controller module 112 at block 916.

At block 918, the controller 206 controls the switches 202g, 202h such that the first switch 202g is closed, while the second switch 202h is open. A current path between the high-side terminal 321 and the low-side terminal 322 is thus formed through the second portion of the power transmitting/receiving element 115 (i.e., the portion between terminals 115a and 115c of the center-tap coil) and the first switch 202g. A voltage (+) is present at the center-tap node 115c, as current is provided through the power transmitting/receiving element 115 in the direction shown by arrow 913.

Blocks 912 through 918 of FIG. 9B thus illustrate the process for controlling the power share controller module 112 through a full power transmitting wave cycle. The process returns 910 to block 912 at the completion of each full wave cycle, thereby generating a half-amplitude, two-level PWM power signal.

Figures 10A, 10B:
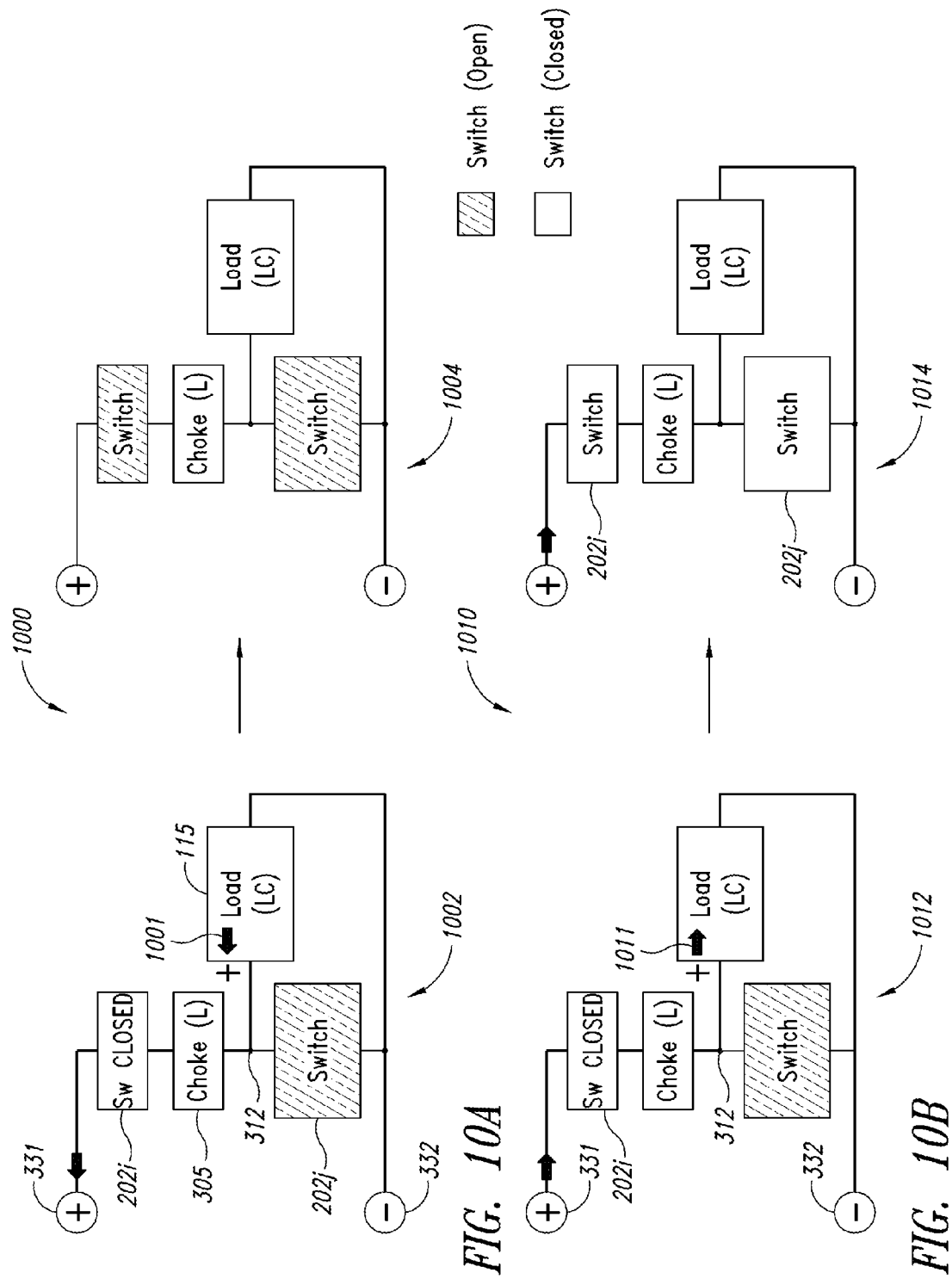
FIGS. 10A and 10B are flow-charts illustrating processes for controlling a power share controller module configured as a modified class E/F circuit when operated in power receiving and power transmitting modes.

FIGS. 10A and 10B are flow-charts illustrating processes for controlling a power share controller module 112 configured as a modified class E/F circuit (shown, for example, in FIG. 4D), when operated in power receiving and power transmitting modes. The power share controller module 112, configured as such, includes an inductive choke 305 and first and second switches 202i, 202j.

FIG. 10A is a flow-chart illustrating a process 1000 for controlling the power share controller module 112 when receiving power (e.g., from a power transmitting device) to provide half-wave rectification.

At block 1002, a voltage (+) is present at node 312, as current is induced through the power transmitting/receiving element 115 in the direction shown by arrow 1001. The current and/or voltage may be sensed by one or more of the sensors 204. The sensors 204 provide a sense signal 221 to the controller 206, which controls the operation of the switches 202i, 202j based on the sense signal 221. As shown at block 1002, based on the sensed current or voltage, the controller 206 controls the switches 202i, 202j such that the first switch 202i is closed, and the second switch 202j is open. Accordingly, a current path between the low-side terminal 332 and the high-side terminal 331 is formed through the power transmitting/receiving element 115, the inductive choke 305 and the first switch 202i.

At block 1004, the first and second switches 202i, 202j are opened, as no current or voltage is sensed through the power transmitting/receiving element 115. That is, no power is being received by the power share controller module 112 at block 1004.

The process 1000 returns to block 1002 at the completion of each wave cycle, thereby producing a half-wave rectification. The rectified power may be provided to the power management block 208, and may thus be used to power a device connected to the power share controller module 112 (such as, for example, first or second devices 110, 120 shown in FIG. 2) and/or to recharge the batteries 118 of such a device.

FIG. 10B is a flow-chart illustrating a process 1010 for controlling the power share controller module 112 (arranged as a modified class E/F circuit) when transmitting power (e.g., to a power receiving device) to provide a half-amplitude, two-level pulse-width modulated (PWM) power transmission signal (e.g., +1V, 0V).

At block 1012, the controller 206 controls the switches 202i, 202j such that the first switch 202i is closed, and the second switch 202j is open. Accordingly, a current path between the high-side terminal 331 and the low-side terminal 312 is formed through the inductive choke 305, the power transmitting/receiving element 115 and the first switch 202i. A voltage (+) is present at node 312, as current is provided through the power transmitting/receiving element 115 in the direction shown by arrow 1011.

At block 1014, the controller 206 controls the switches 202i, 202j such that both the first and second switches 202i, 202j are closed, thereby providing a 0V power signal through the power transmitting/receiving element 115.

The process returns to block 1012 at the completion of each full wave cycle, thereby generating a half-amplitude, two-level PWM power signal.

FIGS. 11A and 11B are flow-charts illustrating processes for controlling a power share controller module 112 configured as a modified current-mode, class D circuit (shown, for example, in FIG. 4E) when operated in power receiving and power transmitting modes. The power share controller module 112, configured as such, includes first and second inductive chokes 315, 325 and first through fourth switches 202k-n.

FIG. 11A is a flow-chart illustrating a process 1100 for controlling the power share controller module 112 when receiving power (e.g., from a power transmitting device) to provide full wave rectification. At block 1102, the process 1100 begins with all of the switches 202k-n in an open state, as power has not been received through the power transmitting/receiving element 115.

At block 1104, a voltage (+) is present at node 314, as current is induced through the power transmitting/receiving element 115 in the direction shown by arrow 1101. The current and/or voltage may be sensed by the sensors 204. The sensors 204 provide a sense signal 221 to the controller 206, which controls the operation of the switches 202k-n based on the sense signal 221. As shown at block 1104, based on the sensed current or voltage, the controller 206 controls the switches 202k-n such that the first and fourth switches 202k, 202n are closed, or in a conduction state. At the same time, the second and third switches 202l, 202m are open. Accordingly, a current path between the low-side terminal 342 and the high-side terminal 341 is formed through the power transmitting/receiving element 115, the first inductive choke 315, and the first and fourth switches 202k, 202n.

At block 1106, all of the switches 202k-n are opened, as no current or voltage is sensed through the power transmitting/receiving element 115. That is, no power is being received by the power share controller module 112 at block 1106.

At block 1108, a voltage (+) is present at node 316, as current is induced through the power transmitting/receiving element 115 in the direction shown by arrow 1103. The current and/or voltage is sensed by the sensors 204, which provide a sense signal 221 to the controller 206, as described above. As shown at block 1108, based on the sensed current or voltage, the controller 206 controls the switches 202k-n such that the second and third switches 202l, 202m are closed, while the first and fourth switches 202k, 202n are open. A current path between the low-side terminal 342 and the high-side terminal 341 is thus formed through the power transmitting/receiving element 115, the second inductive choke 325, and the second and third switches 202l, 202m.

Blocks 1102 through 1108 of FIG. 11A thus illustrate the process for controlling the power share controller module 112 when receiving power through a full wave cycle from the power transmitting device. The process returns to block 1102 at the completion of each full wave cycle, thereby producing a full wave rectification. The rectified power be provided to the power management block 208, and may thus be used to power a device connected to the power share controller module 112 (such as, for example, first or second devices 110, 120 shown in FIG. 2) and/or to recharge the batteries 118 of such a device.

FIG. 11B is a flow chart illustrating a process 1110 for controlling the power share controller module 112 when transmitting power (e.g., to a power receiving device) to provide a full-amplitude, three-level pulse-width modulated (PWM) power transmission signal (e.g., +1V, 0V, −1V). At block 1112, the process 1110 begins with all of the switches 202*k*-*n* closed, thereby transmitting a 0V power signal.

At block 1114, the controller 206 controls the switches 202*k*-*n* such that the first, third and fourth switches 202*k*, 202*l*, 202*n* are closed, and the second switch 202*l* is open. Accordingly, a current path between the high-side terminal 341 and the low-side terminal 342 is formed through the power transmitting/receiving element 115 and the first and fourth switches 202*k*, 202*n*. A voltage (+) is present at node 314, as current is provided through the power transmitting/receiving element 115 in the direction shown by arrow 1111.

At block 1116, all of the switches 202*k*-*n* are closed, and a 0V power signal is transmitted by the power share controller module 112 at block 1116.

At block 1118, the controller 206 controls the switches 202*k*-*n* such that the first, second and third switches 202*k*, 202*l*, 202*m* are closed, while the fourth switch 202*n* is open. A current path between the high-side terminal 341 and the low-side terminal 342 is thus formed through the power transmitting/receiving element 115 in the direction shown by arrow 1113, and a voltage (+) is present at node 316.

Blocks 1112 through 1118 of FIG. 11B thus illustrate a process for controlling the power share controller module 112 through a full power transmitting wave cycle. The process returns to block 1112 at the completion of each full wave cycle, thereby generating a full-amplitude, three-level PWM power signal.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wireless power transmitting/receiving device, comprising:
- a power transmitting/receiving element;
- a plurality of switches, each of the plurality of switches having a control terminal and a conduction terminal, the conduction terminal being coupled to the power transmitting/receiving element;
- a current sensor configured to sense a current through the power transmitting/receiving element;
- a controller coupled to the current sensor and the plurality of switches, the controller being configured to control the plurality of switches based on the sensed current; and
- a plurality of switch driver circuits, each of the switch driver circuits configured to selectively drive a respective switch in a first mode and a second mode, wherein the switch driver circuits drive the switches based on control signals received from the controller in the first mode, and the switch driver circuits drive the switches as a sync rectifier in the second mode,
- wherein each of the plurality of switch driver circuits includes:
  - a digital multiplexer having a first input configured to receive the control signals from the controller for driving the switch in the first mode, and a second input configured to receive second control signals for driving the switch in the second mode; and
  - a switch driver having an input and an output, the input being coupled to an output of the digital multiplexer.

2. The device of claim 1 wherein the power transmitting/receiving element comprises an inductive coil.

3. The device of claim 1 wherein each of the plurality of switch drivers is coupled to the control terminal of a respective one of the plurality of switches.

4. The device of claim 1 wherein the plurality of switches includes first, second, third and fourth transistors arranged in an H-bridge having a high-side terminal and a low-side terminal,
- the first and second transistors having respective first conduction terminals coupled to the high-side terminal,
- the third and fourth transistors having respective first conduction terminals coupled to the low-side terminal,
- the first and third transistors having respective second conduction terminals coupled to a first terminal of the power transmitting/receiving element, and
- the second and fourth transistors having respective conduction terminals coupled to a second terminal of the power transmitting/receiving element.

5. The device of claim 1 wherein the plurality of switches includes first and second transistors arranged in a half H-bridge having a high-side terminal and a low-side terminal,
- the first transistor having a first conduction terminal coupled to the high-side terminal,
- the second transistor having a first conduction terminal coupled to the low-side terminal and to a first terminal of the power transmitting/receiving element, and
- the first and second transistors having respective second conduction terminals coupled to a second terminal of the power transmitting/receiving element.

6. The device of claim 1 wherein the power transmitting/receiving element comprises a center-tap coil having a first terminal, a second terminal and a center-tap terminal, the plurality of switches including first and second transistors, the first transistor having a first conduction terminal coupled to the first terminal of the center-tap coil, the second transistor having a first conduction terminal coupled to the second terminal of the center-tap coil.

7. The device of claim 1, further comprising an inductive choke having a first terminal coupled to a first terminal of the power transmitting/receiving element, wherein the plurality of switches includes first and second transistors, the first transistor having a first conduction terminal coupled to a second terminal of the inductive choke, the second transistor having a first conduction terminal coupled to the first terminal of the power transmitting/receiving element and a second conductive terminal coupled to a second terminal of the power transmitting/receiving element.

8. The device of claim 1, further comprising first and second inductive chokes, the first inductive choke having a first terminal coupled to a first terminal of the power transmitting/receiving element, the second inductive choke having a first terminal coupled to a second terminal of the power transmitting/receiving element,
- wherein the plurality of switches includes first, second, third and fourth transistors, the first transistor having a first conduction terminal coupled to a second terminal of the first inductive choke,
- the second transistor having a first conduction terminal coupled to the first terminal of the power transmitting/receiving element,
- the third transistor having a first conduction terminal coupled to a second terminal of the second inductive choke, the fourth transistor having a first conduction terminal coupled to the second terminal of the power transmitting/receiving element.

9. The device of claim 1, further comprising a plurality of voltage sensors, the plurality of voltage sensors being configured to sense a voltage across respective ones of the plurality of switches.

10. A method, comprising:
controlling a power share controller module, the power share controller module being operable to transmit power in a power transmitting mode, and to receive power in a power receiving mode, the controlling including:
sensing a current through a power transmitting/receiving element; and
controlling the plurality of switches based on the sensed current, the plurality of switches being coupled to the power transmitting/receiving element, each of the switches having an associated switch driver circuit, the switch driver circuits being configured to selectively drive the switches in a first mode in which the switch driver circuits drive the switches based on control signals received from a controller, and in a second mode in which the switch driver circuits drive the switches as a sync rectifier, each of the switch driver circuits including a digital multiplexer having a first input configured to receive the control signals from the controller for driving the switch in the first mode, and a second input configured to receive second control signals for driving the switch in the second mode, and a switch driver having an input and an output, the input being coupled to an output of the digital multiplexer;
in the power receiving mode, controlling the plurality of switches includes:
generating a rectified power signal;
in the power transmitting mode, controlling the plurality of switches includes:
generating a pulse-width modulated (PWM) power signal.

11. The method of claim 10 wherein in the power receiving mode, generating the rectified power signal includes:
during a first power receiving phase, activating first and second transistors of an H-bridge, the first transistor being coupled between a high-side terminal and a first terminal of the power transmitting/receiving element, and the second transistor being coupled between a second terminal of the power transmitting/receiving element and a low-side terminal; and
during a second power receiving phase, activating third and fourth transistors of the H-bridge, the third transistor being coupled between the high-side terminal and the second terminal of the power transmitting/receiving element, the fourth transistor being coupled between the first terminal of the power transmitting/receiving element and the low-side terminal.

12. The method of claim 11 wherein, in the power transmitting mode, generating the pulse-width modulated (PWM) power signal includes:
generating at least one of: a full-amplitude, two-level PWM power signal and a full-amplitude, three-level PWM power signal.

13. The method of claim 10 wherein in the power receiving mode, generating the rectified power signal includes:
during a first power receiving phase:
activating a first transistor, the first transistor being coupled between a high-side terminal and a first terminal of the power transmitting/receiving element, and
deactivating a second transistor, the second transistor being coupled between the first terminal of the power transmitting/receiving element and a second terminal of the power transmitting/receiving element; and
during a second power receiving phase:
deactivating the first transistor.

14. The method of claim 13 wherein, in the power transmitting mode, generating the pulse-width modulated (PWM) power signal includes:
generating a half-amplitude, two-level PWM power signal.

15. The method of claim 10, the power transmitting/receiving element comprising a center-tap coil, wherein in the power receiving mode, generating the rectified power signal includes:
during a first power receiving phase, activating a first transistor coupled to a first terminal of the center-tap coil; and
during a second power receiving phase, activating a second transistor coupled to a second terminal of the center-tap coil.

16. The method of claim 15 wherein, in the power transmitting mode, generating the pulse-width modulated (PWM) power signal includes:
generating a half-amplitude, two-level PWM power signal.

17. The method of claim 10 wherein the power share controller module includes an inductive choke having a first terminal coupled to a first terminal of the power transmitting/receiving element, wherein the plurality of switches includes first and second transistors, the first transistor having a first conduction terminal coupled to a second terminal of the inductive choke, the second transistor having a first conduction terminal coupled to the first terminal of the power transmitting/receiving element and a second conductive terminal coupled to a second terminal of the power transmitting/receiving element, wherein, in the power receiving mode, generating the rectified power signal includes:
activating the first transistor and deactivating the second transistor during a first power receiving phase; and
deactivating the first transistor during a second power receiving phase.

18. The method of claim 17 wherein, in the power transmitting mode, generating the pulse-width modulated (PWM) power signal includes:
generating a half-amplitude, two-level PWM power signal.

19. The method of claim 10 wherein the power share controller module includes first and second inductive chokes, the first inductive choke having a first terminal coupled to a first terminal of the power transmitting/receiving element, the second inductive choke having a first terminal coupled to a second terminal of the power transmitting/receiving element, wherein the plurality of switches includes first, second, third and fourth transistors, the first transistor having a first conduction terminal coupled to a second terminal of the first inductive choke, the second transistor having a first conduction terminal coupled to a first terminal of the power transmitting/receiving element, the third transistor having a first conduction terminal coupled to a second terminal of the second inductive choke, the fourth transistor having a first conduction terminal coupled to a second terminal of the power transmitting/receiving element, wherein, in the power receiving mode, generating the rectified power signal includes:
activating the first and fourth transistors during a first power receiving phase; and
activating the second and third transistors during a second power receiving phase.

20. The method of claim 19 wherein, in the power transmitting mode, generating the pulse-width modulated (PWM) power signal includes:
generating a full-amplitude, three-level PWM power signal.

21. A wireless power transmitting and receiving circuit, comprising:
an inductive coil;
a plurality of switches, each of the plurality of switches having a control terminal and a conduction terminal, the conduction terminal being coupled to the inductive coil;
a current sensor configured to sense a current through the inductive coil;
a controller coupled to the current sensor and the plurality of switches, the controller being configured to control the plurality of switches based on the sensed current; and
a plurality of switch driver circuits, each of the switch driver circuits configured to selectively drive a respective switch in a first mode and a second mode, wherein the switch driver circuits drive the switches based on control signals received from the controller in the first mode, and the switch driver circuits drive the switches as a sync rectifier in the second mode,
wherein each of the plurality of switch driver circuits includes:
a digital multiplexer having a first input configured to receive the control signals from the controller for driving the switch in the first mode, and a second input configured to receive second control signals for driving the switch in the second mode; and
a switch driver having an input and an output, the input being coupled to an output of the digital multiplexer,
wherein, in a power receiving mode, the circuit is configured to generate a rectified power signal,
wherein, in a power transmitting mode, the circuit is configured to generate a pulse-width modulated (PWM) power signal.

22. The circuit of claim 21 wherein each of the plurality of switch drivers is coupled to the control terminal of a respective one of the plurality of switches.

23. The circuit of claim 21, further comprising a plurality of voltage sensors, the plurality of voltage sensors being configured to sense a voltage across the inductive coil.

24. A wireless power transmitting and receiving circuit, comprising:
an inductive coil;
a plurality of switches, each of the plurality of switches having a control terminal and a conduction terminal, the conduction terminal being coupled to the inductive coil;
a voltage sensor configured to sense a voltage through the inductive coil;
a controller coupled to the current sensor and the plurality of switches, the controller being configured to control the plurality of switches based on the sensed voltage; and
a plurality of switch driver circuits, each of the switch driver circuits configured to selectively drive a respective switch in a first mode and a second mode, wherein the switch driver circuits drive the switches based on control signals received from the controller in the first mode, and the switch driver circuits drive the switches as a sync rectifier in the second mode,
wherein each of the plurality of switch driver circuits includes:
a digital multiplexer having a first input configured to receive the control signals from the controller for driving the switch in the first mode, and a second input configured to receive second control signals for driving the switch in the second mode; and
a switch driver having an input and an output, the input being coupled to an output of the digital multiplexer,
wherein, in a power receiving mode, the circuit is configured to generate a rectified power signal, and
wherein, in a power transmitting mode, the circuit is configured to generate a pulse-width modulated (PWM) power signal.

25. The wireless power transmitting/receiving device of claim 1 wherein each of the plurality of switch driver circuits further includes an analog multiplexer coupled between the output of the switch driver and the respective switch.

* * * * *